(12) United States Patent
Shahmohammadian et al.

(10) Patent No.: US 10,122,555 B2
(45) Date of Patent: Nov. 6, 2018

(54) CROSS-PHASE ESTIMATION FOR DUAL POLARIZED MICROWAVE TRANSCEIVER

(71) Applicant: Huawei Technologies Co., Ltd., Shenzhen (CN)

(72) Inventors: Hoda Shahmohammadian, Ottawa (CA); Ahikam Aharony, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/075,666

(22) Filed: Mar. 21, 2016

(65) Prior Publication Data

US 2017/0272288 A1    Sep. 21, 2017

(51) Int. Cl.
*H04L 27/02* (2006.01)
*H04L 5/04* (2006.01)

(52) U.S. Cl.
CPC .............. *H04L 27/02* (2013.01); *H04L 5/04* (2013.01)

(58) Field of Classification Search
CPC .................................. H04L 27/02; H04L 5/04
USPC .......................................................... 375/261
See application file for complete search history.

(56) References Cited

U.S. PATENT DOCUMENTS

| 4,090,137 | A | 5/1978 | Soma et al. |
| 5,309,484 | A | 5/1994 | McLane et al. |
| 5,710,799 | A | 1/1998 | Kobayashi |
| 7,046,753 | B2 | 5/2006 | Resheff et al. |
| 7,200,196 | B2 | 4/2007 | Li et al. |
| 8,396,177 | B1 | 3/2013 | Morris |
| 8,477,056 | B2 | 7/2013 | Sun et al. |
| 2002/0060643 | A1* | 5/2002 | Levy ................. H01Q 3/26 342/367 |
| 2002/0061752 | A1* | 5/2002 | Kurokami ........... H04B 7/0885 455/447 |
| 2010/0290552 | A1* | 11/2010 | Sasaki ................. H04B 7/0413 375/267 |
| 2013/0188579 | A1* | 7/2013 | Touboul .............. H04B 7/0413 370/329 |
| 2017/0019274 | A1 | 1/2017 | Liu et al. |

FOREIGN PATENT DOCUMENTS

| WO | 2007057911 A2 | 5/2007 |
| WO | 2015112048 A1 | 7/2015 |
| WO | 2015149373 A1 | 10/2015 |

OTHER PUBLICATIONS

International Search Report for PCT/CN2016/110796 dated Mar. 21, 2017.

* cited by examiner

*Primary Examiner* — Michael Neff (57) ABSTRACT

Cross-phase interference occurs in dual polarized or orthogonal polarized microwave links when independent local oscillators (LOs) are utilized in each outdoor unit (ODU) transceiver operating on the same frequency channel. If the cross-phase noise is not compensated the performance of the microwave link will be degraded. In order to reduce cross-phase noise two or more pilot symbols are utilized to enable cross-phase noise estimates to be determined at the receiver of the microwave link. The pilot symbols enable a cross-phase noise compensation factor to be determined for the signal from the one or more cross-phase noise estimates. The received signal can then be compensated using the estimated cross-phase noise compensation factor.

25 Claims, 8 Drawing Sheets

CROSS-PHASE ESTIMATION FOR DUAL POLARIZED MICROWAVE TRANSCEIVER

TECHNICAL FIELD

The present disclosure relates to dual polarized microwave transceivers and in particular to cross-polarization interference cancellation (XPIC) in dual polarized microwave transceivers.

BACKGROUND

The capacity of a microwave or line-of-sight point-to-point communications link can be increased by transmitting two orthogonal signals in the same frequency channel. The two orthogonal signals, horizontally (H) and vertically (V) polarized, can be generated by independent transmitters of outdoor units (ODU) or microwave transceivers having separate local oscillators (LOs). The signals are combined at the antenna by an orthogonal mode transducer (OMT) to double capacity per channel and allow sharing of the frequency channel. However, the separate LOs are not in synchronization and generate frequency offset and phase noise on the carrier of the signal which impact on performance of the communication link. Noise from the LO on one polarization results in cross-phase interference on the orthogonal polarization operating in the same frequency channel. The relative phase noise between the horizontal and vertical local oscillators is called cross-polarization phase noise and can be very difficult to mitigate particularly when independent ODUs are utilized without LO synchronization or feedback between ODUs. Accordingly, improved cross-polarization interference cancellation (XPIC) in dual polarized microwave transceivers remains highly desirable.

SUMMARY

In accordance with an aspect of the present disclosure there is provided a method of cross-phase noise compensation on a microwave communication link, the method comprising: receiving a plurality of transmitted consecutive pilot symbols in temporal proximity to each other from a signal having a first polarization on the microwave communication link; and compensating the signal having the first polarization by estimating cross-phase noise from the plurality of transmitted pilot symbols wherein cross-phase interference is introduced from a signal having a second polarization orthogonal to the first polarization on the microwave communication link.

In accordance with another aspect of the present disclosure there is provided a method of cross-phase interference compensation on a microwave communication link, the method comprising: determining one or more cross-phase noise estimates from each of a plurality of transmitted pilot symbols on a signal having a first polarization on the microwave communication link, wherein cross-phase interference is introduced from a signal up-converted and transmitted using an independent local oscillator (LO) of a second polarization orthogonal to the first polarization on the microwave communication link; determining cross-phase noise compensation factor for the signal having the first polarization from the one or more cross-phase noise estimates; and compensating the signal having the first polarization using the estimated cross-phase noise compensation factor.

In accordance with yet another aspect of the present disclosure there is provided a microwave link outdoor unit (ODU) comprising: a radio for receiving a signal having a first polarization; and a demodulator for receiving a signal from the radio having a first polarization, the demodulator determining one or more cross-phase noise estimates from each of a plurality of transmitted pilot symbols on the signal having a first polarization, wherein cross-phase interference is introduced from a signal having a second polarization orthogonal to the first polarization on the microwave communication link, wherein the signal having the first polarization is compensated by the one or more cross-phase noise estimates.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
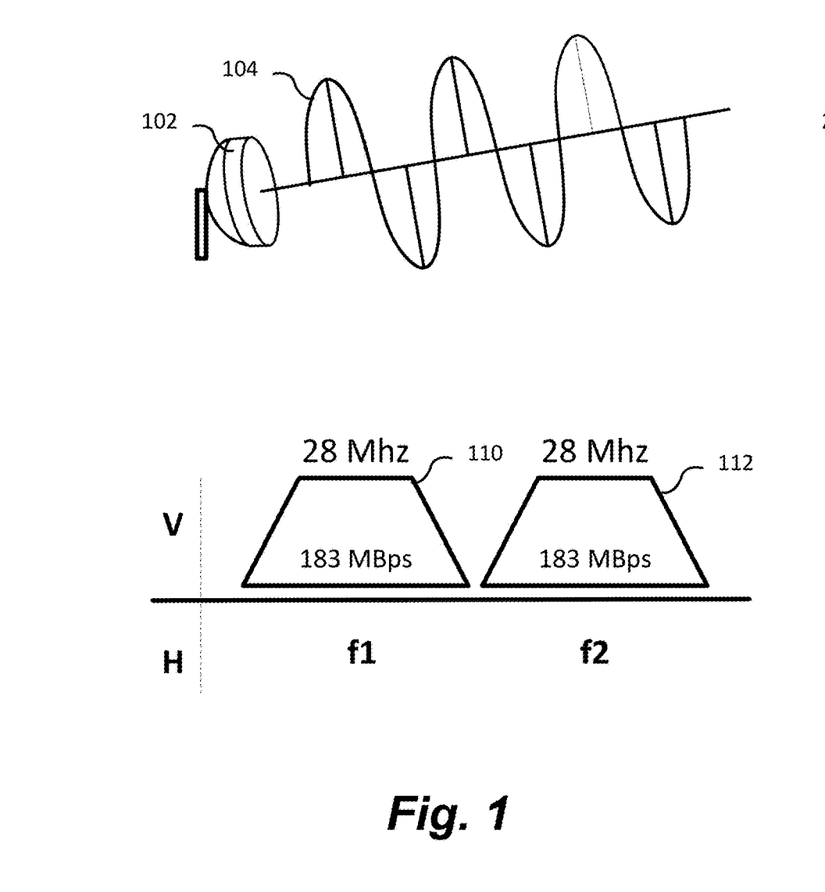
FIG. 1 shows a representation of a single polarization microwave channel.

Embodiments are described below, by way of example only, with reference to FIGS. 1 to 10. Each microwave link is limited by the capacity of the bandwidth and coding of the carrier frequency. In order to increase the capacity per channel orthogonal signal polarizations can be utilized to effectively double the capacity of the channel. However, the introduction of orthogonal signals in the same frequency channel results in cross-phase interference between signals as a result of frequency offset and phase noise on each signal caused by independently-operated local oscillators of the orthogonal transmitter. A representation of a microwave link using single polarization is shown in FIG. 1. The microwave link illustrated comprises a vertically polarized signal 104 that is transmitted through an antenna 102. Frequency channels 110 or 112 in the microwave link are of the same polarization and are of a defined bandwidth but are on separate carrier frequencies f1 and f2. The channels 110, 112 may be for example 28 MHZ bandwidth which would be capable of carrying 183 Megabits/second (MBps) using a 256 quadrature amplitude modulation (QAM). Other bandwidths and modulations can be utilized to provide different data rates depending on the requirements of the microwave link. In order to increase capacity in a single polarization configuration multiple frequency channels are required.

Figure 2:
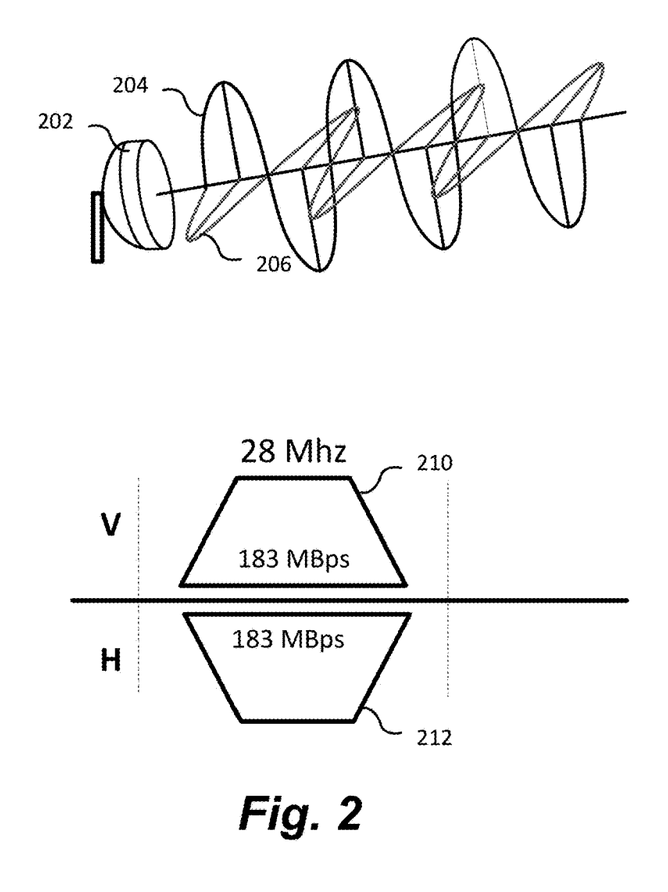
FIG. 2 shows a representation of a dual polarized microwave channel.

With reference to FIG. 2, to increase capacity within the same frequency channel a second orthogonal horizontal polarization signal is introduced providing two communication channels in the same frequency channel. Two separate ODUs transmit orthogonal signals, a vertical polarization signal 204 and a horizontal polarization signal 206, on frequency channels 210, 202 having a same carrier frequency, through an antenna 202. By using independent ODUs the complexity and deployment of cross-polarization links is reduced, however it introduces cross-polarization interference between polarizations affected by the phase noise of their independently-operated LOs. Utilizing two single ODUs as a dual polarized ODU, rather that design a specialized dual polarized ODU, simplifies the implementation but increases interference which decreases channel performance if the cross-phase interference is not mitigated.

Figure 3:
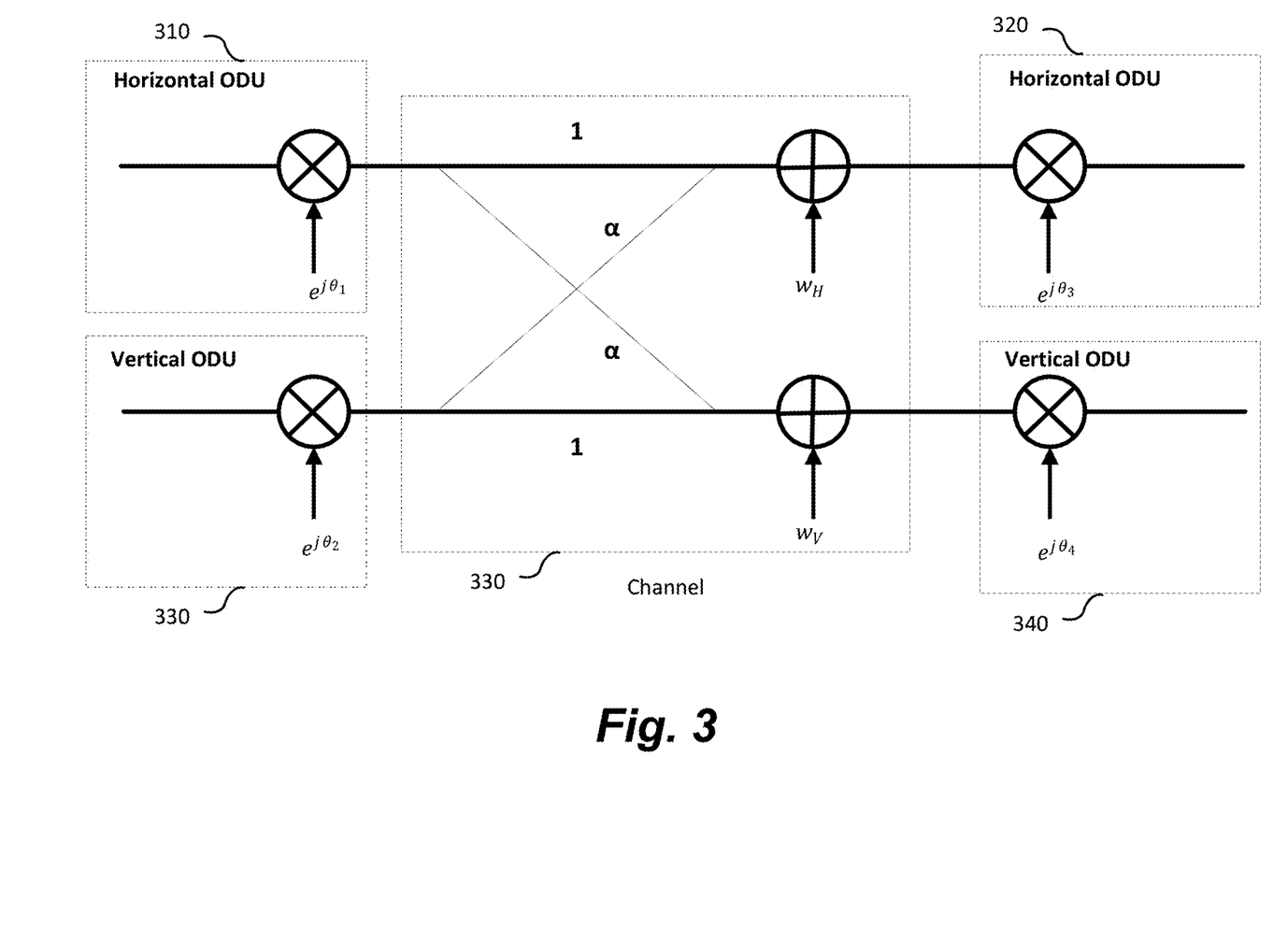
FIG. 3 shows a schematic illustration of cross polarization interference.

FIG. 3 shows a schematic illustration of cross polarization interference. Transmit ODUs 310 and 330 have respective LOs which result in phase noise $e^{j\theta_1}$ and $e^{j\theta_2}$ being introduced from transmitter into the respective polarized signal. As the microwave link propagates through channel 332, cross-polarization interference component α is introduced between the polarizations in the same frequency channel. Additive white Gaussian noise (AWGN) $w_H$ and $w_V$ is also introduced to each polarization. ODU receivers 320 and 340 receive the respective polarizations and further phase noise $e^{j\theta_3}$ and $e^{j\theta_4}$ is introduced from receiver LOs. The ODU receiver 320 receives a horizontal signal having frequency and phase noise components from $e^{j\theta_1}$, $e^{j\theta_3}$ and a contribution from the orthogonal polarization having phase noise component from $e^{j\theta_2}$ and $e^{j\theta_3}$. The ODU receiver 340 receives a vertical signal having frequency and phase noise components from $e^{j\theta_2}$, $e^{j\theta_4}$ and a contribution from the orthogonal polarization having phase noise component from $e^{j\theta_1}$ and $e^{j\theta_4}$.

In order to reduce cross-phase interference between orthogonal signals pilot transmissions comprising a sequence of pilots from transmitter 310 to receiver 320 can be utilized so that the receiver 320 can compensate cross-phase interference and perform XPIC by estimating the receiver's cross-phase noise. The pilot sequence is added to the signal using a predefined symbol sequence at the transmitter before payload data is transmitted. The receiver 320 can then utilize the expected sequence to estimate receiver's cross-phase noise and apply a compensation factor to the received data symbols. The pilot sequence transmission eliminates the need to synchronize transmitted symbols between the horizontal and vertical polarizations allowing the ODUs to operate independently. The ODUs can therefore operate at higher performance and lower error rates in a dual polarization configuration without connection between the ODUs simplifying the configuration. Cross-phase noise estimation in the receiver of the ODU benefits from information of pilots and results in improved performance. The number of pilots utilized can be selected based upon performance requirements of the microwave channel, the capacity performance trade-off between overhead added by the pilots, the quality of the LOs utilized in the ODUs or the desired improvement in the cross-phase noise estimation based upon the selected modulation scheme among other potential determining factors.

Figure 4:
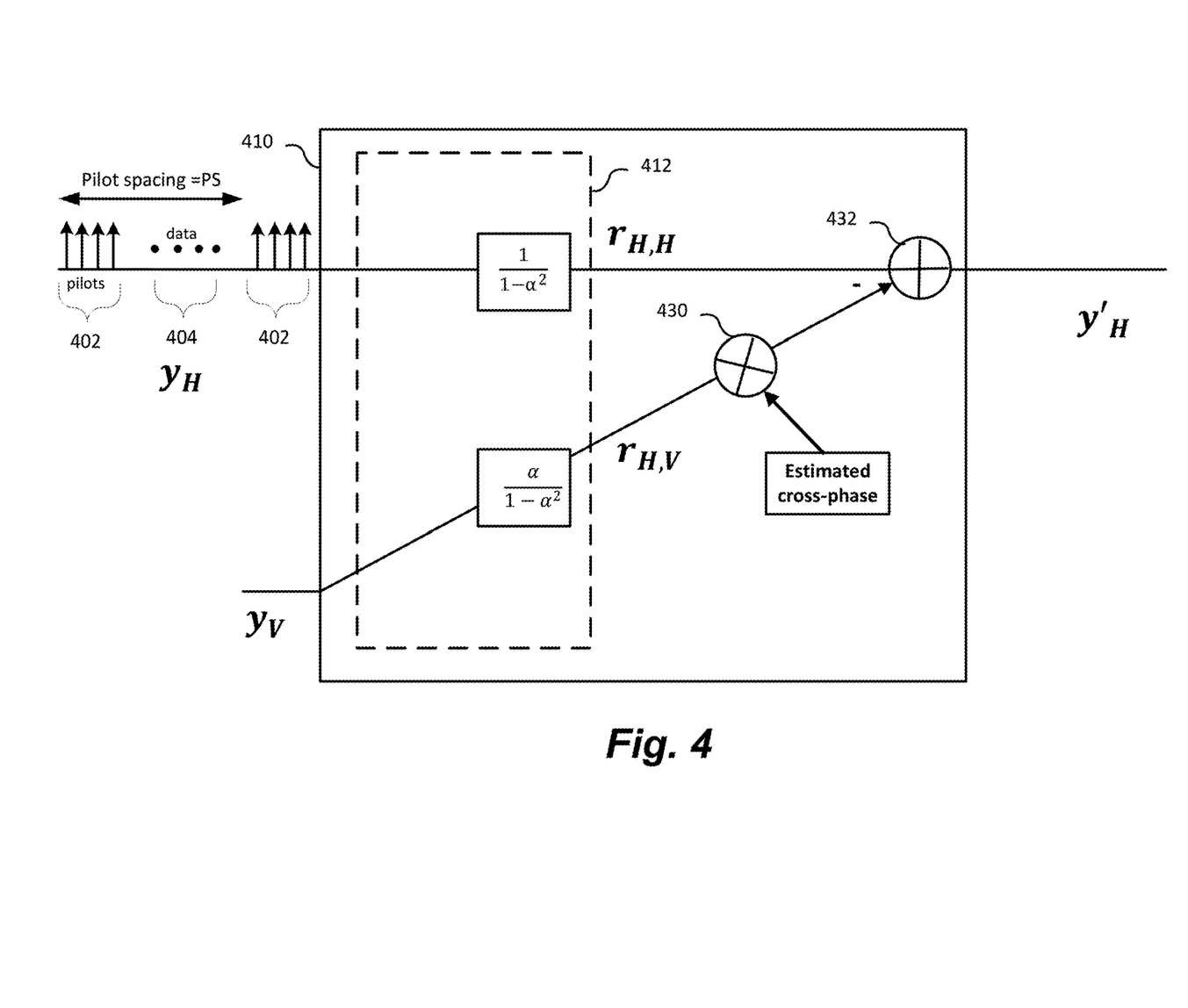
FIG. 4 shows a functional representation of an adaptive equalizer for cross polarization interference cancellation (XPIC) in an ODU.

Referring to FIG. 4, a functional representation of an adaptive equalizer 410 is shown for cross polarization interference cancellation (XPIC) in the corresponding receiver of ODU 310. In order to mitigate cross-phase interference a pilot transmission 402 is added to data symbols 404 and is used to estimate cross-phase noise at the adaptive equalizer 410. The pilot transmission 402 comprises two or more pilots transmitted at the beginning of a data sequence or payload comprising data symbols 404. The received signals $y_H$ and $y_V$ are processed by channel equalizer 412. Given α is the cross-polarization interference factor, channel equalizer 412 receives a signal $$\frac{1}{1-\alpha^2}$$

component from the main horizontally polarized signal and a signal $$\frac{\alpha}{1-\alpha^2}$$

component from the vertically polarized signal. In the adaptive equalizer 410, equalized orthogonal polarized signal $r_{H,V}$ contributes the receiver's cross-phase noise compensation factor $ee^{j\varphi}$ multiplied 430 and is then subtracted 432 from equalized main horizontally polarized signal $r_{H,H}$. In this example four consecutive pilots are transmitted every PS symbols, where PS is the pilot spacing defined by the data payload.

In the embodiment where four pilots are transmitted, for each pilot there are:

$$r_{H,H,m} - e^{j\varphi_m} r_{H,V,m} = s_{HP,m} e^{j\theta_{13,m}} + w_{H,m} \quad m=1,\ldots,4$$

Where m is the number of received pilot symbol, $r_{H,H,m}$ is the received horizontally polarized signal for the received pilot, $e^{j\varphi_m} r_{H,V,m}$ is the cross-phase interference contribution from the orthogonal vertical polarization, $s_{HP,m} e^{j\theta_{13,m}}$ is the transmitted pilot signal with the phase noise of the LOs of the transmitter and receiver for the horizontal polarization, and $w_{H,m}$ is the AWGN in the transmitted symbol of the horizontally polarized signal. Since phase noise (both main channel $\theta_{13}$ and receiver's cross-phase $\varphi$) do not change significantly for consecutive symbols, it can be assumed they are approximately constant for all four pilots. Hence:

$$r_{H,H,m} - e^{j\varphi} r_{H,V,m} = s_{HP,m} e^{j\theta_{13}} + w_{H,m} \quad m=1,\ldots,4$$

Although in presence of a pilot the white noise can be ignored, it will cause estimation error on the receiver's cross-phase noise estimates. In order to decrease the estimation error averaging over four pilots can be helpful to decrease the variance of white noise.

Ignoring white noise in presence of pilot, for every two pilots, two channel approximation equations and two unknown parameters are provided:

$$r_{H,H,m} - e^{j\varphi} r_{H,V,m} = s_{HP,m} e^{j\theta_{13}}$$

$$r_{H,H,n} - e^{j\varphi} r_{H,V,n} = s_{HP,n} e^{j\theta_{13}}$$

Solving equations for receiver's cross-phase noise φ, results in:

$$\varphi = \text{angle}\left(\frac{r_{H,H,m}s_{HP,n} - r_{H,H,n}s_{HP,m}}{r_{H,V,m}s_{HP,n} - r_{H,V,n}s_{HP,m}}\right)$$

Since there are four pilots, 6 sets of equations results and consequently 6 estimates for φ. Therefore in the example of four pilots, for the horizontal polarization the following pairs of equations for m and n are generated:

|   | m | n | Cross phase noise |
|---|---|---|---|
| 1 | $r_{H,H,1}$ | $r_{H,H,2}$ | $\varphi_{1,2}$ |
| 2 | $r_{H,H,1}$ | $r_{H,H,3}$ | $\varphi_{1,3}$ |
| 3 | $r_{H,H,1}$ | $r_{H,H,4}$ | $\varphi_{1,4}$ |
| 4 | $r_{H,H,2}$ | $r_{H,H,3}$ | $\varphi_{2,3}$ |
| 5 | $r_{H,H,2}$ | $r_{H,H,4}$ | $\varphi_{2,4}$ |
| 6 | $r_{H,H,3}$ | $r_{H,H,4}$ | $\varphi_{3,4}$ |

Each estimate may suffer from severe error due to the white noise and unknown transmitted signal on the orthogonal polarization or may be very accurate. In order to derive the probability of having each $\varphi_i$ (i.e. $p(\varphi_i)$ i=1, . . . , 6), an estimate corresponding $\theta_{13}$ of that $\varphi_i$ is first required. To illustrate, for each estimated $\varphi_i$ i=1, . . . , 6, the four pilots and their corresponding equations are used to estimate the main channel phase noise $\theta_{13,k}$ k=1, . . . , 4. The probability of having each combination case of $\varphi_i$ and $\theta_{13,k}$ is the probability of white noise in that scenario and is calculated as follows:

$$p(\varphi_i \mid \text{using } k\text{th pilot}) = \frac{1}{\sqrt{2\pi\sigma^2}} e^{-\frac{|r_{H,H,k} - e^{j\varphi_i} r_{H,V,k} - s_{HP,k} e^{j\theta_{13,k}}|^2}{2\sigma^2}}$$

In order to decrease the white noise variance and reduce the estimation error, the estimation benefits from the four independent pilot transmissions. Since there are four independent pilots (i.e. four independent white noise equations), the probability of having $\varphi_i$ is:

$$p(\varphi_i) = \prod_k p(\varphi_i \mid \text{using } k\text{th pilot})$$

And the final metric is simplified to:

$$\sum_k |r_{H,H,k} - e^{j\varphi_i} r_{H,V,k} - s_{HP,k} e^{j\theta_{13,k}}|^2$$

Then from six cross-phase estimates, the one that has the minimum above metric is selected ($\varphi_{est}$) to provide compensation factor comprising an inverse of the determined interference that is applied 432 to the data sequence to produce $y'_H$ to cancel out or reduce the cross-phase interference.

Additionally or alternatively, once a cross-phase compensation estimate or compensation factor is determined for a pilot group, estimates from consecutive pilot groups may be utilized to interpolate cross-phase noise on data symbols between the pilot groups in order to reach an estimate for all symbols (i.e. payload as well as pilots) phases. Cross-phase noise interpolation for symbols in between of pilot groups may be interpreted either by a simple linear interpolation or more generally by Wiener filtering. In linear interpolation, cross-phase of all other symbols in between of two consecutive pilot groups are modeled with a straight line connecting estimated cross-phase of those two pilot groups. Alternatively, interpolation may be done using Wiener filtering specially for low signal-to-noise ratio (SNR) scenarios. In Wiener filtering, a weighted average over cross-phase estimates of N groups of consecutive pilots are used to estimate cross-phase of intermediate symbols. Wiener filter coefficients are typically optimized based on minimum mean square error (MMSE) or linear MMSE estimation theory. Since pilot-interpolated cross-phase noise is only being removed from received signals, pilot cross-phase estimates should be sufficiently accurate enough to be used to compensate the received signal, otherwise even a small estimation error of pilot cross-phase noise may result in a burst error. Linear interpolation of pilot phases reduces the level of cross-phase noise significantly comparing to phase-lock-loop (PLL) implementations.

It should be noted that for the vertically polarized signal the cross-phase noise estimation may utilize the horizontal cross-phase noise component $\theta_{14}$ and the vertical LO noise defined by $\theta_{24}$. The use of less than four pilot symbols may utilize less bandwidth but may not provide as accurate a phase noise estimate as only two equations for the pilots would be generated. If more than two pilots are utilized additional equations and estimates are generated however overhead would be increased on the channel.

Figure 5:
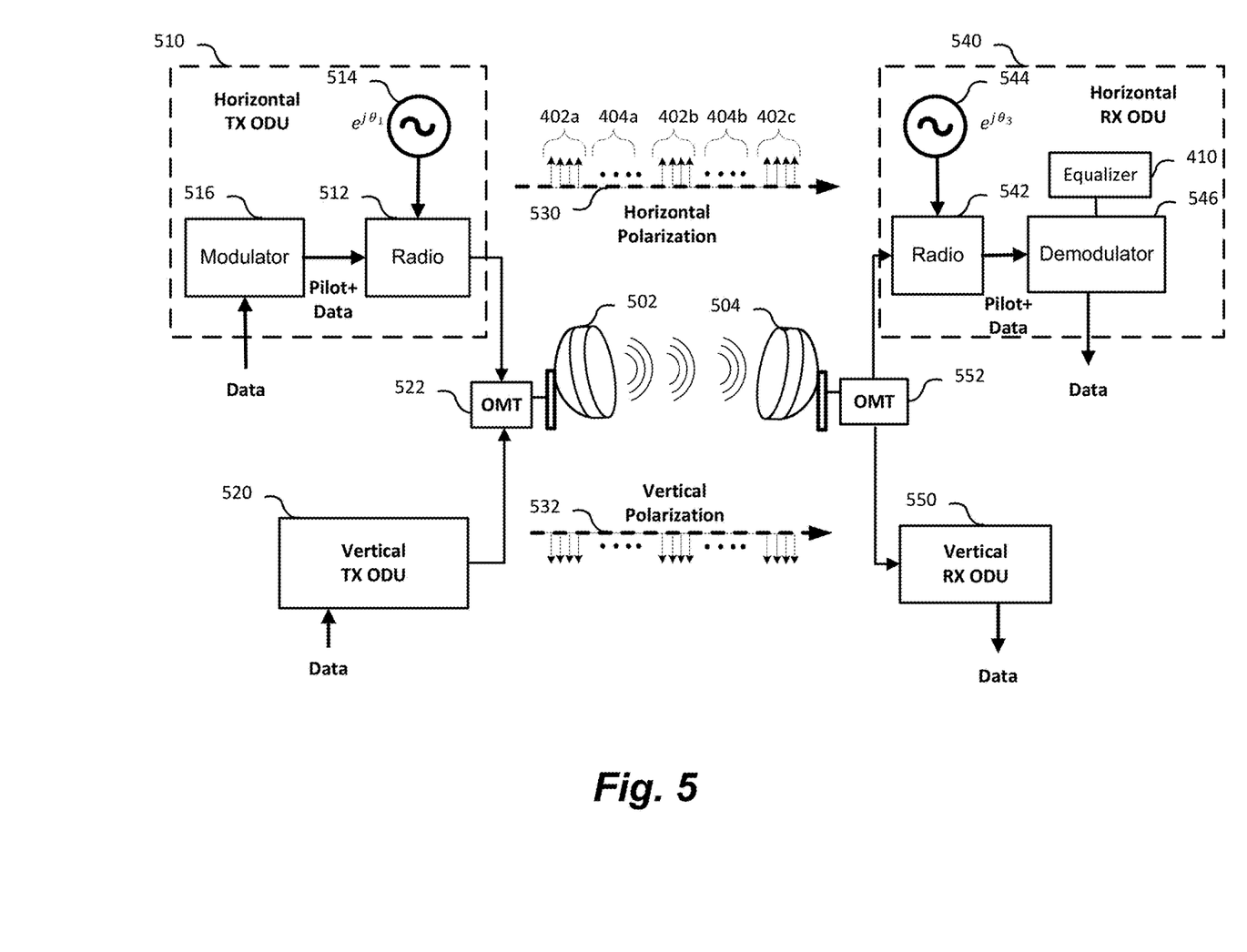
FIG. 5 shows a representation of a dual polarized microwave link system.

FIG. 5 shows a representation of a dual polarized microwave link system. A horizontal transmit ODU 510 transmits a horizontally polarized signal containing pilot symbols 402a, 402b, 402c and data symbols 404a, 404b through an antenna 502. Data for transmission is provided to a modulator 516 which inserts the pilot symbols 402a-c in the data symbols 404a-b in addition with coding and signalling overhead which is then modulated. The modulator 516 is coupled to a radio 512 which up-converts the signal onto a carrier at a frequency generated by an LO 514. The radio 512 is coupled to an OMT 522 which is coupled to the antenna 502. A vertical transmit ODU 520 is also coupled to the OMT 522 and provides a vertically polarized signal to antenna 502. The vertical transmit ODU 520 has the same components of the horizontal ODU 510 and operates in the same manner. The OMT 522 combines the horizontal signal and vertical signal for transmission across the microwave link. The LO of ODU 520 generates cross-phase noise contributing interference on the transmitted horizontal polarization signal 530 and the LO 514 similarly results in cross-phase interference on vertical polarization signal 532. The microwave link is received at antenna 504 and the horizontal polarization signal 530 and vertical polarization signal 532 are separated by the OMT 552 and provided to both horizontal receiver ODU 540 and vertical receiver ODU 550. The receiver ODU 540 comprises a radio 542 for down-converting the received signal at a frequency generated by LO 544. A demodulator 546 coupled to the radio 542 demodulates the signal and performs equalization of the received signals using an adaptive equalizer 410 to compensate for channel impairments. The adaptive equalizer 410 utilizes the received pilot symbols to generate receiver's cross-phase noise estimates and apply a compensation factor to the data symbols in the demodulation process. Estimates for individual pilot sequences 402a, 402b and 402c may be determined and interpolated for the data symbols 404a and 404b provided between the pilot spacing. For example estimates for pilot transmission 402a and 402b may be interpolated to estimate cross-phase noise on data symbols 404*a*. Pilot transmission 402*b* and 402*c* may be interpolated to estimate cross-phase noise on data symbols 404*b*.

Although the ODUs 510, 520, 540, 550 are described as providing either transmit or receive functions the ODU may be capable of providing both transmit and receive functions in the same device to provide a bi-directional microwave link. The configurations may include additional components not shown in order to provide the functionality described. The functions or sub-functions of the ODUs may be provided in hardware, firmware, or components which execute software or some combinations thereof. Electronic devices that may be suitable for this purpose may include but not be limited to microprocessors, microcontrollers, programmable logic devices (PLDs), field programmable gate arrays (FPGA), digital signal processors (DSPs), application specific integrated circuits (ASICs) and other types of integrated circuits. Additional components not described may be included in the ODU or sub-components such as for example analog-to-digital convertors (ADCs) and digital-to-analog converts (DACs). Non-transitory memory may also be provide in the ODUs or coupled to the devices for storing instructions and storing data to perform the functions of the method described. The addition of the pilot symbols may be provided by software programming of the transmitting ODU where the receiving ODU expects the pilot symbols to be present in the received signal or may detect the pilot symbols at the commencement of a data frame and perform the method accordingly.

Figure 6:
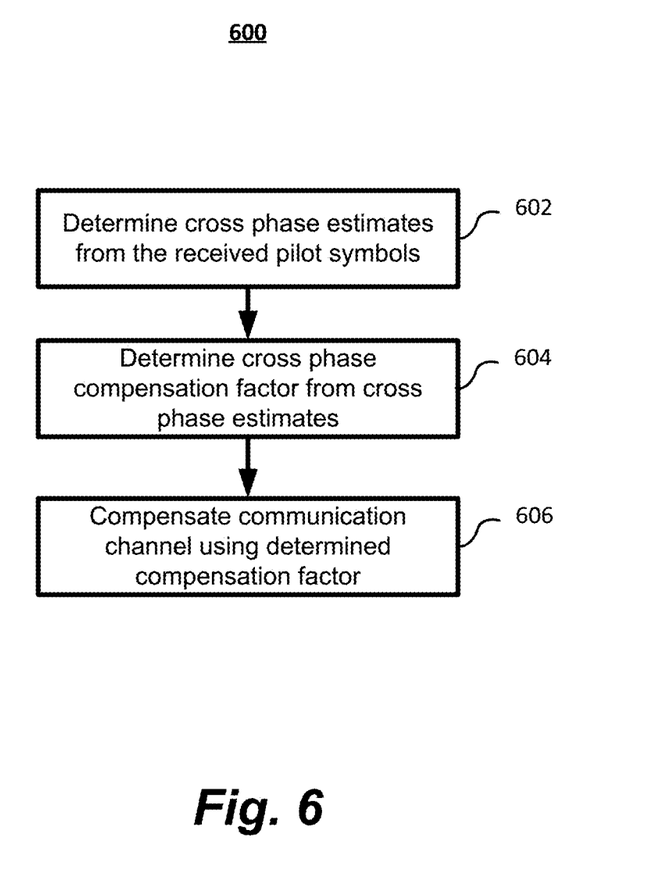
FIG. 6 shows a flowchart of a method of cross-phase estimation on a microwave communication link in an ODU using two or more pilot symbols.

FIG. 6 shows a flowchart of a method 600 of a receiver's cross-phase noise estimation in an ODU using two or more pilot symbols on the main horizontal polarization. To enable cross-phase noise estimate the transmitting ODU 510 must provide defined pilot symbols 402*a*, 402*b* over the microwave communication link. The number of symbols sent can be determined based upon the modulation, bandwidth or performance requirements of the microwave link however both transmitting 510 and receiving 540 ODUs must be configured or determine the presence of pilot symbols. Pilot symbols 402*a*, 402*b* are received at the receiving ODU 540 on a main microwave communication signal having a first polarization on the microwave communication link. One or more cross-phase noise estimates are determined by an adaptive equalizer 410 with support of each of a plurality of transmitted pilot symbols on a first polarization in a step 602. The number of estimates is determined based upon the number of pilot symbols that are transmitted. The cross-phase interference on the 'main' channel results from an orthogonal signal transmitted on have a second polarization or 'cross' channel. A cross-phase noise compensation factor is determined for the microwave communication signal having the first polarization from the one or more cross-phase noise estimates in a step 604. The microwave communication signal having the first polarization can then be compensated using the estimated cross-phase compensation factor by subtracting the estimated corresponding cross-phase inference of other polarization from the received signal in a step 606.

Figure 7:
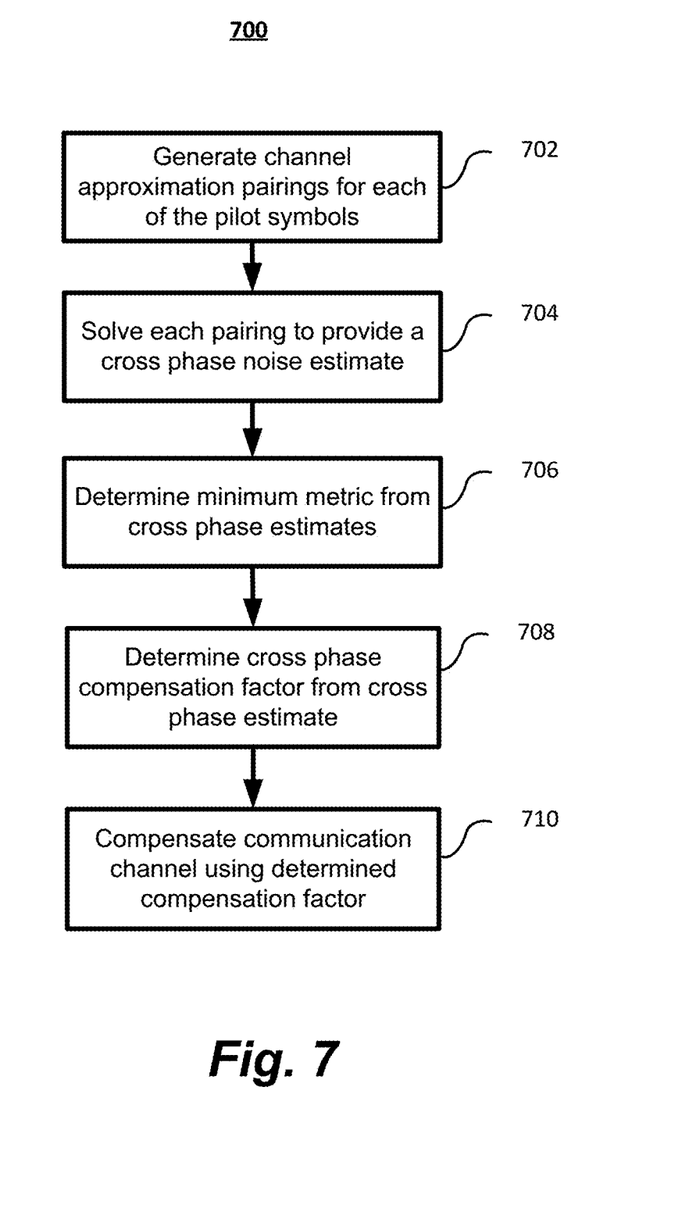
FIG. 7 shows a flowchart of a method of cross-phase estimation on a microwave communication link in an ODU using three or more pilot symbols.

FIG. 7 shows a flowchart of a method 700 of cross-phase noise compensation in an ODU 540 using three or more pilot symbols. The method 700 may be used to determine cross-phase noise estimates for transmitted pilots as described in FIG. 8. Three or more cross-phase noise estimates are determined for each of the plurality of transmitted pilot symbols 402*a*, 402*b* by generating (in a step 702) channel approximation pairings from the received plurality of symbols. The number of estimates is determined based upon the number of pilot symbols 402*a*, 402*b* that are transmitted. Each pair of noise approximations, for example six approximation would be generated if four pilot symbols are transmitted, is solved (in a step 704) to generate a respective cross-phase noise estimate. A minimum metric is then determined (in a step 706) from the generated cross-phase noise estimates. A cross-phase compensation factor is determined (in a step 708) from the minimum metric for the microwave communication signal having the first polarization from the two or more cross-phase noise estimates. The microwave communication signal having the first polarization can then be compensated (in a step 710) using the estimated cross-phase noise compensation factor by subtracting the estimated corresponding phase inference of other polarization from the received signal.

Figure 8:
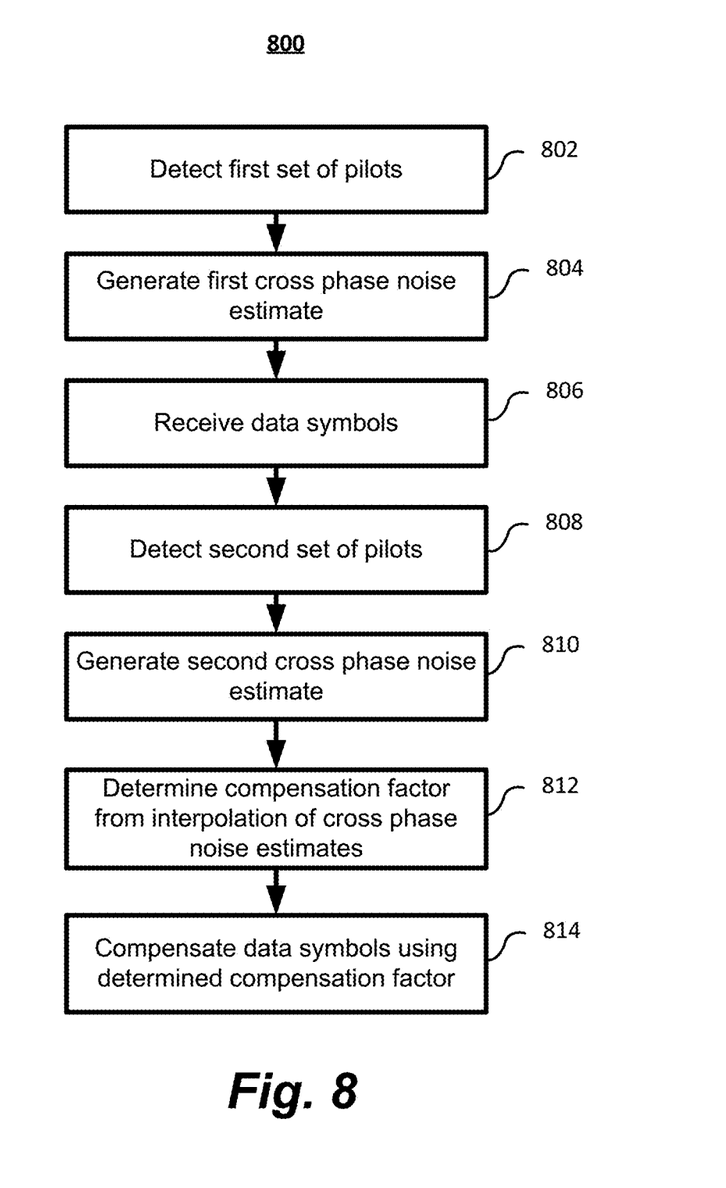
FIG. 8 shows a flowchart of a method of interpolating cross-phase noise between pilot symbols using cross-phase estimation.

FIG. 8 shows a flowchart of a method 800 of linear interpolating cross-phase noise between pilot symbols using cross-phase estimation. The method 800 provides for linear interpolation of phase noise estimates to be applied to data symbols. A first set of pilots 402*a* is detected (in a step 802) at the ODU. From the first set of pilots a first cross-phase noise estimate is determined (in a step 804) according to the method described in FIG. 6 or 7. Data symbols are then received (in a step 806) after the pilot symbols and are buffered in the demodulator until a second set of pilot symbols is detected (in a step 808). A second cross-phase noise estimate is then determined (in a step 810) from the second set of pilot symbols. From the estimates a phase noise estimate is interpolated to determine (in a step 812) a compensation factor to be applied to the data symbols. The interpolation may be performed by linear interpolation using two consecutive estimates, alternatively, interpolation may be performed utilizing Wiener filtering where a weighted average over cross-phase estimates of N groups of consecutive pilots are used to estimate cross-phase of intermediate symbols. The received data symbols are then compensated (in a step 814) using the determined compensation factor. The process is then repeated for the next set of data symbols, wherein the second phase noise estimate is utilized as the first phase noise estimate and a new second phase noise estimate is determined. Additionally, or alternatively, the generated phase noise estimates or interpolated phase noise estimates may be further averaged or weighted to compensate for the phase noise over additional consecutive symbols periods.

Figure 9:
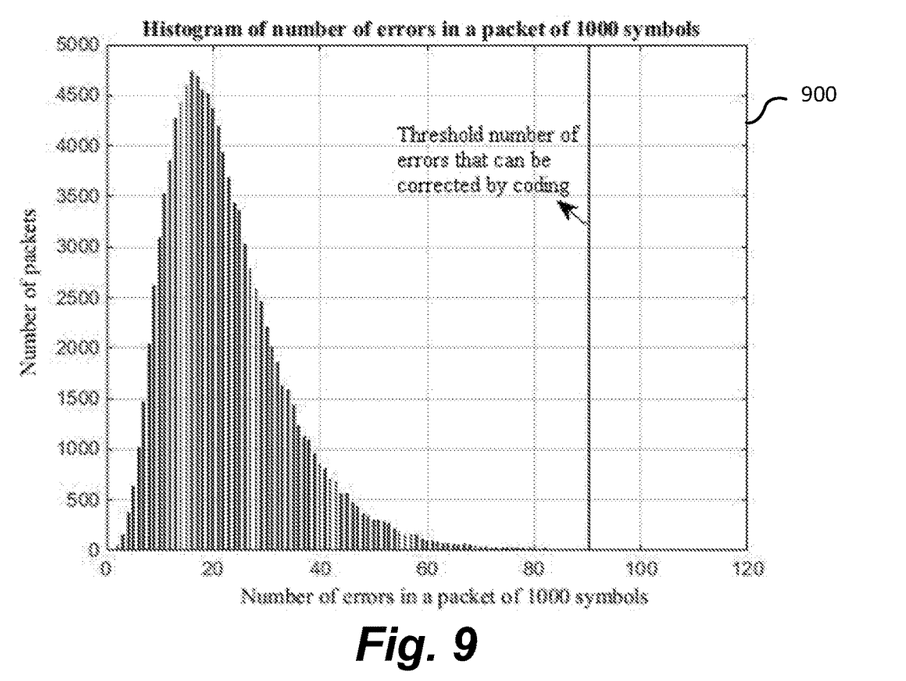
FIG. 9 shows a histogram illustrating the number of errors in a packet for simulation of phase noise compensation according to an implementation of the present disclosure.

FIG. 9 shows a histogram 900 of a number of errors in a packet of 1000 symbols in a 2048 QAM cross polarized generated in a simulation using the method of cross-polarization described. A bandwidth of 6.1 MBps, phase noise of $-88$ dBC/HZ @ 100 KHz, $\alpha=15$ dB and signal to noise ratio of 44 dB were utilized in generating the histogram. Under typical circumstance only QAM 256 could be achieved whereas using cross-phase noise compensation disclosed a 9 dB improvement can be achieved enabling higher 2048 QAM.

Figure 10:
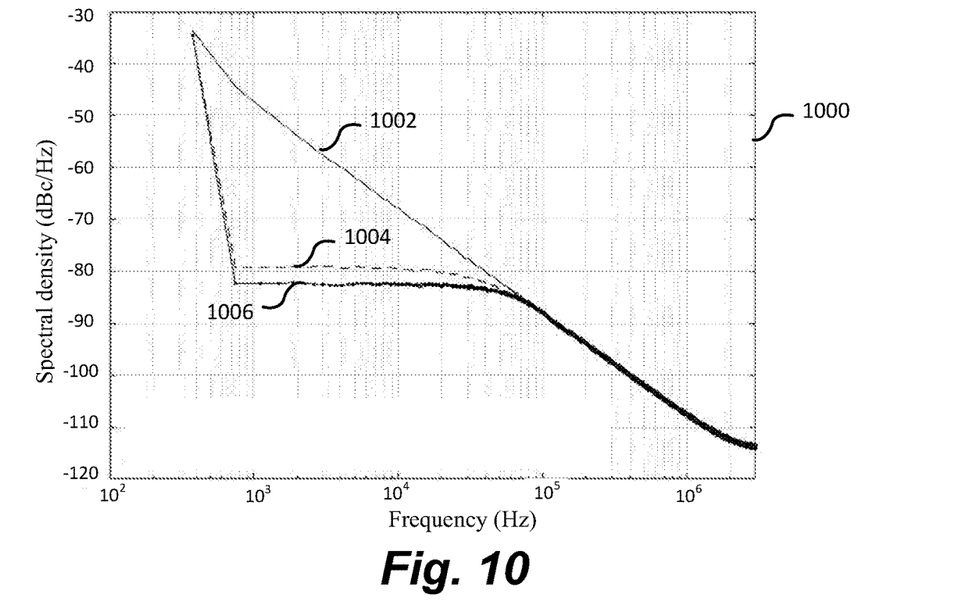
FIG. 10 shows a comparison of the performance of a signal having XPIC and using cross-phase estimation versus exact pilot phases.

FIG. 10 shows a graph 1000 of a comparison of the performance of signal having XPIC applied and the improvement using cross-phase estimation versus exact pilot phases utilizing four pilot symbols. The receiver's cross-phase noise 1002 is shown with residual cross-phase after linear interpolation of consecutive estimated pilot phases 1004 as provided by the described system and method. The residual cross-phase after linear interpolation of exact pilot phases 1006 is also shown and is within 3 db of the estimated phase noise. The improvement in performance can enable higher modulations to be utilized and reduced ODU complexity.

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

It would be appreciated by one of ordinary skill in the art that the system and components shown in FIGS. 1 to 10 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of cross-phase noise compensation on a microwave communication link provided by at least two independent pairs of transmitter/receiver outdoor units (ODUs), the method comprising:
   receiving, by a first one of the at least two independent receiver ODUs, a signal having a first polarization transmitted from a first one of the at least two independent transmitter ODUs of the microwave communication link, the received signal comprising a plurality of transmitted consecutive pilot symbols in temporal proximity to each other; and
   compensating, by the first one of the two independent receiver ODUs, the signal having the first polarization by estimating cross-phase noise in the plurality of transmitted pilot symbols wherein cross-phase interference is introduced from a signal having a second polarization orthogonal to the first polarization and transmitted from a second one of the at least two independent transmitter ODUs of the microwave communication link, and wherein estimating the cross-phase noise is performed by the first one of the at least two independent receiver ODUs independently from all of said receiver ODUs other than said first one of the at least two independent receiver ODUs.

2. The method of claim 1 wherein compensating the signal having the first polarization further comprises:
   determining one or more cross-phase noise estimates from each of the plurality of transmitted consecutive pilot symbols;
   determining a cross-phase compensation factor for the signal having the first polarization from the one or more cross-phase noise estimates; and
   compensating the signal having the first polarization using the estimated cross-phase compensation factor.

3. The method of claim 1 wherein the plurality of transmitted consecutive pilot symbols comprises two consecutive pilots.

4. The method of claim 3 wherein the plurality of consecutive pilot symbols comprises four consecutive pilots wherein six cross-phase noise estimates are determined from the four consecutive pilots.

5. The method of claim 1 wherein compensating is performed according to a formula:

$$r_{H,H} - e^{j\varphi}r_{H,V} = s_{HP}e^{j\Theta_{13}}$$

where $r_{H,H}$ is a channel equalized received horizontally polarized signal;
   $e^{j\varphi}r_{H,V}$ is a cross-phase interference from a channel equalized vertically polarized signal on the horizontally polarized signal where $\varphi$ is the cross-phase noise component; and
   $s_{HP}e^{j\Theta_{13}}$ is a horizontally polarized transmitted pilot signal affected with phase noise of local oscillators $e^{j\Theta_2}$ of a transmitter and $e^{j\Theta_3}$ of a receiver for the horizontally polarized signal of the microwave communication link.

6. The method of claim 1 wherein compensating is performed according to a formula:

$$r_{V,V} - e^{j\varphi}r_{V,H} = s_{VP}e^{j\Theta_{24}}$$

where $r_{V,V}$ is a channel equalized received vertically polarized signal;
   $e^{j\varphi}r_{V,H}$ is a cross-phase interference from a channel equalized horizontally polarized signal on the vertically polarized signal where $\varphi$ is the cross-phase noise component; and
   $s_{VP}e^{j\Theta_{24}}$ is a vertically polarized transmitted pilot signal affected with phase noise of local oscillators $e^{j\Theta_2}$ of a transmitter and $e^{j\Theta_4}$ of a receiver for the vertically polarized signal of the microwave communication link.

7. The method of claim 2 wherein determining the cross-phase compensation factor further comprises:
   generating channel approximation pairing for each of the transmitted plurality of consecutive pilot symbols;
   solving each pairing to provide the one or more cross-phase noise estimates; and
   determining a minimum metric from the one or more of cross-phase noise estimates.

8. The method of claim 7 wherein compensating is performed according to a formula:

$$r_{H,H} - e^{j\varphi}r_{H,V} = s_{HP}e^{j\Theta_{13}}$$

where $r_{H,H}$ is a channel equalized received horizontally polarized signal;
   $e^{j\varphi}r_{H,V}$ is a cross-phase interference from a channel equalized vertically polarized signal on the horizontally polarized signal, where $\varphi$ is the cross-phase noise component; and
   $s_{HP}e^{j\Theta_{13}}$ is a horizontally polarized transmitted pilot signal affected with phase noise of local oscillators $e^{j\Theta_2}$ of a transmitter and $e^{j\Theta_2}$ of a receiver for the horizontally polarized signal of the microwave communication link;
   wherein the noise compensation factor is determined by solving for each set of transmitted pilot symbols by:

$$\varphi = \text{angle}\left(\frac{r_{H,H,m}s_{HP,n} - r_{H,H,n}s_{HP,m}}{r_{H,V,m}s_{HP,n} - r_{H,V,n}s_{HP,m}}\right)$$

where m and n are a number of the pilot symbol between 1 to M transmitted pilot symbols.

9. The method of claim 7 wherein compensating is performed according to a formula:

$$r_{V,V} - e^{j\varphi} r_{V,H} = s_{VP} e^{j\Theta_{24}}$$

where $r_{V,V}$ is a channel equalized received vertically polarized signal;
$e^{j\varphi} r_{V,H}$ is a cross-phase interference from a channel equalized horizontally polarized signal on the vertically polarized signal where $\varphi$ is the cross-phase noise component; and
$s_{VP} e^{j\Theta_{24}}$ is a vertically polarized transmitted pilot signal affected with phase noise of local oscillators $e^{j\Theta_2}$ of a transmitter and $e^{j\Theta_4}$ of a receiver for the vertically polarized signal of the microwave communication link;
wherein a cross-phase compensation factor associated with a first set of pilot symbols is interpolated with a cross-phase compensation factor associated with a second set of pilot symbols to compensate the signal having the first polarization.

10. The method of claim 1 wherein compensating the signal further comprises:
determining a first compensation factor for a first set of pilot symbols; and
determining a second compensation factor for a second set of pilot symbols received subsequent to the first set of pilot symbols;
wherein the determined first and second compensation factors are applied to data received between the first set of pilot symbols and the second set of pilot symbols.

11. The method of claim 10 wherein cross-phase compensation of the signal is performed by obtaining a linear approximation between the first and second compensation factors and by applying the approximation to data received between the first and second sets of pilot symbols.

12. The method of claim 2 wherein the cross-phase compensation factor is determined by applying a Wiener filter approximation on the cross-phase noise estimates of pilot symbols based upon N groups of consecutive pilots.

13. The method of claim 1 wherein the phase noise between consecutive pilots does not vary significantly between consecutive symbols.

14. An outdoor unit (ODU) of a microwave communication link provided by at least two independent pairs of transmitter/receiver, the ODU comprising:
a radio for receiving a signal having a first polarization and transmitted from a first one of the at least two independent transmitter ODUs of the microwave communication link; and
a demodulator for receiving the signal from the radio, the demodulator determining one or more cross-phase noise estimates from each one of a plurality of transmitted pilot symbols of the signal having the first polarization, wherein cross-phase interference is introduced from a signal having a second polarization orthogonal to the first polarization and transmitted from a second one of the at least two independent transmitter ODUs of the microwave communication link, wherein the signal having the first polarization is compensated by the one or more cross-phase noise estimates, and wherein the ODU comprises a local oscillator which is independent from respective local oscillators of all other receiver ODUs of the at least two independent receiver ODUs.

15. The ODU of claim 14 wherein the plurality of transmitted pilots comprises two consecutive pilots.

16. The ODU of claim 15 wherein the plurality of pilots comprises four consecutive pilots wherein six cross-phase noise estimates are determined from the four consecutive pilots.

17. The ODU of claim 14 wherein compensating is performed according to a formula:

$$r_{H,H} - e^{j\varphi} r_{H,V} = s_{HP} e^{j\Theta_{13}}$$

where $r_{H,H}$ is a channel equalized received horizontally polarized signal;
$e^{j\varphi} r_{H,V}$ is a cross-phase interference from a channel equalized vertically polarized signal on the horizontally polarized signal where $\varphi$ is the cross-phase noise component; and
$s_{HP} e^{j\Theta_{13}}$ is a horizontally polarized transmitted pilot signal affected with phase noise of local oscillators $e^{j\Theta_2}$ of a transmitter and $e^{j\Theta_2}$ of a receiver for the horizontally polarized signal of the microwave communication link.

18. The ODU of claim 14 wherein compensating is performed according to a formula:

$$r_{V,V} - e^{j\varphi} r_{V,H} = s_{VP} e^{j\Theta_{24}}$$

where $r_{V,V}$ is a channel equalized received vertically polarized signal;
$e^{j\varphi} r_{V,H}$ is a cross-phase interference from a channel equalized horizontally polarized signal on the vertically polarized signal where $\varphi$ is the cross-phase noise component; and
$s_{VP} e^{j\Theta_{24}}$ is a vertically polarized transmitted pilot signal affected with phase noise of local oscillators $e^{j\Theta_2}$ of a transmitter and $e^{j\Theta_4}$ of a receiver for the vertically polarized signal of the microwave communication link.

19. The ODU of claim 14 wherein the cross-phase compensation factor further comprises:
generating channel approximation pairing for each of the plurality of transmitted pilot symbols;
solving each pairing to provide the one or more cross-phase noise estimates; and
determining a minimum metric from the one or more cross-phase noise estimates.

20. The ODU of claim 19 wherein compensating is performed according to a formula:

$$r_{H,H} - e^{j\varphi} r_{H,V} = s_{HP} e^{j\Theta_{13}}$$

where $r_{H,H}$ is a channel equalized received horizontally polarized signal;
$e^{j\varphi} r_{H,V}$ is a cross-phase interference from a channel equalized vertically polarized signal on the horizontally polarized signal, where $\varphi$ is the cross-phase noise component; and
$s_{HP} e^{j\Theta_{13}}$ is a horizontally polarized transmitted pilot signal affected with phase noise of local oscillators $e^{j\Theta_2}$ of a transmitter and $e^{j\Theta_4}$ of a receiver for the horizontally polarized signal of the microwave communication link;
wherein the noise compensation factor is determined by solving for each set of transmitted pilot symbols by:

$$\varphi = \text{angle}\left(\frac{r_{H,H,m} s_{HP,n} - r_{H,H,n} s_{HP,m}}{r_{H,V,m} s_{HP,n} - r_{H,V,n} s_{HP,m}}\right)$$

where m and n are a number of the pilot symbol between 1 to M transmitted pilot symbols.

21. The ODU of claim 19 wherein compensating is performed according to a formula:

$$r_{V,V} - e^{j\varphi} r_{V,H} = s_{VP} e^{j\Theta_{24}}$$

where $r_{V,V}$ is a channel equalized received vertically polarized signal;

$e^{j\varphi}r_{V,H}$ is a cross-phase interference from a channel equalized horizontally polarized signal on the vertically polarized signal, where φ is the cross-phase noise component; and $s_{VP}e^{j\Theta_{24}}$ is a vertically polarized transmitted pilot signal affected with phase noise of local oscillators $e^{j\Theta_2}$ of a transmitter and $e^{j\Theta_4}$ of a receiver for the vertically polarized signal of the microwave communication link;

wherein a cross-phase compensation factor associated with a first set of pilot symbols is interpolated with a cross-phase compensation factor associated with a second set of pilot symbols to compensate the signal having the first polarization.

22. The ODU of claim 14 wherein compensating the signal further comprises:

determining a first compensation factor for a first set of pilot symbols; and determining a second compensation factor for a second set of pilot symbols received subsequent to the first set of pilot symbols;

wherein the determined first and second compensation factor are applied to data received between the first set of pilot symbols and the second set of pilot symbols.

23. The ODU of claim 22 wherein cross-phase compensation of the signal is performed by obtaining a linear approximation between the first and second compensation factors and by applying the approximation to data received between the first and second sets of pilot symbols.

24. The ODU of claim 15 wherein the cross-phase noise compensation factor is determined by a Wiener filter approximation on the cross-phase noise estimates of pilot symbols based upon N groups of consecutive pilots.

25. The ODU of claim 14, wherein determining the cross-phase noise estimates is performed by the ODU independently from all other receiver ODUs of the at least two independent receiver ODUs.

\* \* \* \* \*

UNITED STATES PATENT AND TRADEMARK OFFICE
CERTIFICATE OF CORRECTION

PATENT NO. : 10,122,555 B2
APPLICATION NO. : 15/075666
DATED : November 6, 2018
INVENTOR(S) : Hoda Shahmohammadian and Ahikam Aharony Page 1 of 1

It is certified that error appears in the above-identified patent and that said Letters Patent is hereby corrected as shown below:

In the Specification

In the Description:

Column 4, Line 32, "$ee^{j\varphi}$" should read --$e^{j\varphi}$--.

In the Claims

Column 10, Line 20, "$S_{HP}{}^{j\Theta_{13}}$" should read --$S_{HP}e^{j\theta_{13}}$--.

Column 10, Line 21, "$e^{j\theta_2}$" should read --$e^{j\theta_1}$--.

Column 10, Line 57, "$e^{j\theta_2}$" should read --$e^{j\theta_1}$--.

Column 10, Line 58, "$e^{j\theta_2}$" should read --$e^{j\theta_3}$--.

Column 11, Line 5, "$r_{V,V}-e^{j\varphi}r_{V,H}-s_{VP}e^{j\theta_{24}}$" should read --$r_{V,V} - e^{j\varphi}r_{V,H} = s_{VP}e^{j\theta_{24}}$--.

Column 12, Line 16, "$e^{j\theta_2}$" should read --$e^{j\theta_1}$--.

Column 12, Line 17, "$e^{j\theta_2}$" should read --$e^{j\theta_3}$--.

Column 12, Line 52, "$e^{j\theta_2}$" should read --$e^{j\theta_1}$--.

Column 12, Line 53, "$e^{j\theta_4}$" should read --$e^{j\theta_3}$--.

Signed and Sealed this
Eighth Day of January, 2019

Andrei Iancu
*Director of the United States Patent and Trademark Office*